US012320658B2

(12) United States Patent
Suzuki et al.

(10) Patent No.: US 12,320,658 B2
(45) Date of Patent: Jun. 3, 2025

(54) TRAVEL PLAN GENERATION DEVICE AND TRAVEL PLAN GENERATION METHOD

(71) Applicant: Nissan Motor Co., Ltd., Kanagawa (JP)

(72) Inventors: Kenta Suzuki, Kanagawa (JP); Kazuhiro Suzuki, Kanagawa (JP); Yasunori Maruyama, Kanagawa (JP); Toshiharu Nakajima, Kanagawa (JP); Ryoko Yamaguchi, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 17/999,472

(22) PCT Filed: Mar. 17, 2021

(86) PCT No.: PCT/JP2021/010909
§ 371 (c)(1),
(2) Date: Nov. 21, 2022

(87) PCT Pub. No.: WO2021/235070
PCT Pub. Date: Nov. 25, 2021

(65) Prior Publication Data
US 2023/0194282 A1     Jun. 22, 2023

(30) Foreign Application Priority Data
May 22, 2020   (JP) .................................. 2020-089620

(51) Int. Cl.
*G01C 21/34*     (2006.01)
*B60L 53/66*     (2019.01)

(52) U.S. Cl.
CPC .......... *G01C 21/3469* (2013.01); *B60L 53/66* (2019.02); *G01C 21/3476* (2013.01)

(58) Field of Classification Search
CPC ............ G01C 21/3469; G01C 21/3476; G01C 21/3453; G01C 21/3484
See application file for complete search history.

(56) References Cited

U.S. PATENT DOCUMENTS

2012/0109519 A1   5/2012   Uyeki
2012/0290506 A1   11/2012  Muramatsu
(Continued)

FOREIGN PATENT DOCUMENTS

CN   109596137 A    4/2019
JP   2011232208 A   11/2011
(Continued)

*Primary Examiner* — Aaron L Troost
(74) *Attorney, Agent, or Firm* — Osha Bergman Watanabe & Burton LLP

(57) ABSTRACT

A travel plan generation device includes a controller that is configured to: acquire first supply availability information indicating a vacancy state of a first supply facility when the vehicle arrives at a position within a predetermined range from the first supply facility at a predetermined timing after the vehicle starts traveling based on the generated travel plan; and determine whether or not supply of the energy is available at the first supply facility based on the first supply availability information of the first supply facility; and when determining that the supply of the energy is not available at the first supply facility, identify a second supply facility different from the first supply facility and generate the travel plan in which the vehicle passes through the second supply facility instead of the first supply facility.

8 Claims, 3 Drawing Sheets

(56) References Cited

U.S. PATENT DOCUMENTS

| | | | |
|---|---|---|---|
| 2015/0149078 A1* | 5/2015 | Profous | G01C 21/3446 |
| | | | 701/410 |
| 2015/0286965 A1 | 10/2015 | Amano et al. | |
| 2019/0107406 A1 | 4/2019 | Cox et al. | |
| 2019/0178678 A1* | 6/2019 | Rahbari Asr | B60L 53/66 |
| 2019/0202315 A1 | 7/2019 | Wilding et al. | |

FOREIGN PATENT DOCUMENTS

| | | | |
|---|---|---|---|
| JP | 2012251989 A | 12/2012 |
| JP | 2013011458 A | 1/2013 |
| JP | 2013185854 A | 9/2013 |
| JP | 2015215295 A | 12/2015 |
| JP | 2019095310 A | 6/2019 |

* cited by examiner

TRAVEL PLAN GENERATION DEVICE AND TRAVEL PLAN GENERATION METHOD

TECHNICAL FIELD

The present invention relates to a travel plan generation device and a travel plan generation method.

The present application claims priority based on Japanese Patent Application No. 2020-089620 filed on May 22, 2020. For those designated countries which permit the incorporation by reference, the content described and/or illustrated in the above application is incorporated by reference in the present application as part of the description and/or drawings of the present application.

BACKGROUND ART

A technique is known, which determines a recommended charging pattern defined by at least one recommended charging facility on a travel route from a present position to a destination of an electric vehicle and a recommended charging amount in the recommended charging facility (see Patent Document 1: JP2013-11458, for example).

In the technique according to Patent Document 1, the recommended charging pattern is determined on the basis of the travel route from the present position to the destination of an electric vehicle, the remaining battery capacity, the position of a charging facility on the travel route, and the allowable remaining capacity range. The allowable remaining capacity range is a range of possible values for the remaining battery capacity and is set in consideration of an influence of the remaining battery capacity on the battery life.

PRIOR ART DOCUMENT

Patent Document

[Patent Document 1] JP2013-11458

SUMMARY OF INVENTION

Problems to be Solved by Invention

However, in Patent Document 1, there is a problem that the technique cannot change the charging facility through which the vehicle passes even when supply of energy to the vehicle becomes non-available at the recommended charging facility after the vehicle starts traveling toward the destination until the vehicle arrives at the recommended charging facility.

A problem to be solved by the present invention is to provide a travel plan generation device and a travel plan generation method which can change the charging facility through which the vehicle passes when the supply of the energy to the vehicle becomes non-available at the charging facility after the vehicle starts traveling until the vehicle arrives at the charging facility through which the vehicle is scheduled to pass.

Means for Solving Problems

The present invention solves the above problem thorough generating a travel plan in which a vehicle passes through a first supply facility for supplying energy for the vehicle, acquiring supply availability information on energy of a first supply facility at a predetermined timing after the vehicle starts traveling based on the generated travel plan, determining whether or not supply of energy is available at the first supply facility based on the supply availability information, and identifying a second supply facility which is different from the first supply facility when determining that the supply of the energy is not available at the first supply facility, and generating a travel plan in which the vehicle passes through the second supply facility instead of the first supply facility.

Effect of Invention

According to the present invention, the charging facility through which the vehicle passes can be changed when the supply of the energy for the vehicle becomes non-available at the charging facility after the vehicle starts traveling until the vehicle arrives at the charging facility through which the vehicle is scheduled to pass.

MODE(S) FOR CARRYING OUT THE INVENTION

Hereinafter, one or more embodiments of a travel plan generation device according to the present invention will be described with reference to the drawings. The travel plan generation device according to one or more embodiments is a device for generating a travel plan in which a vehicle passes through a supply facility for supplying energy for the vehicle.

Figure 1:
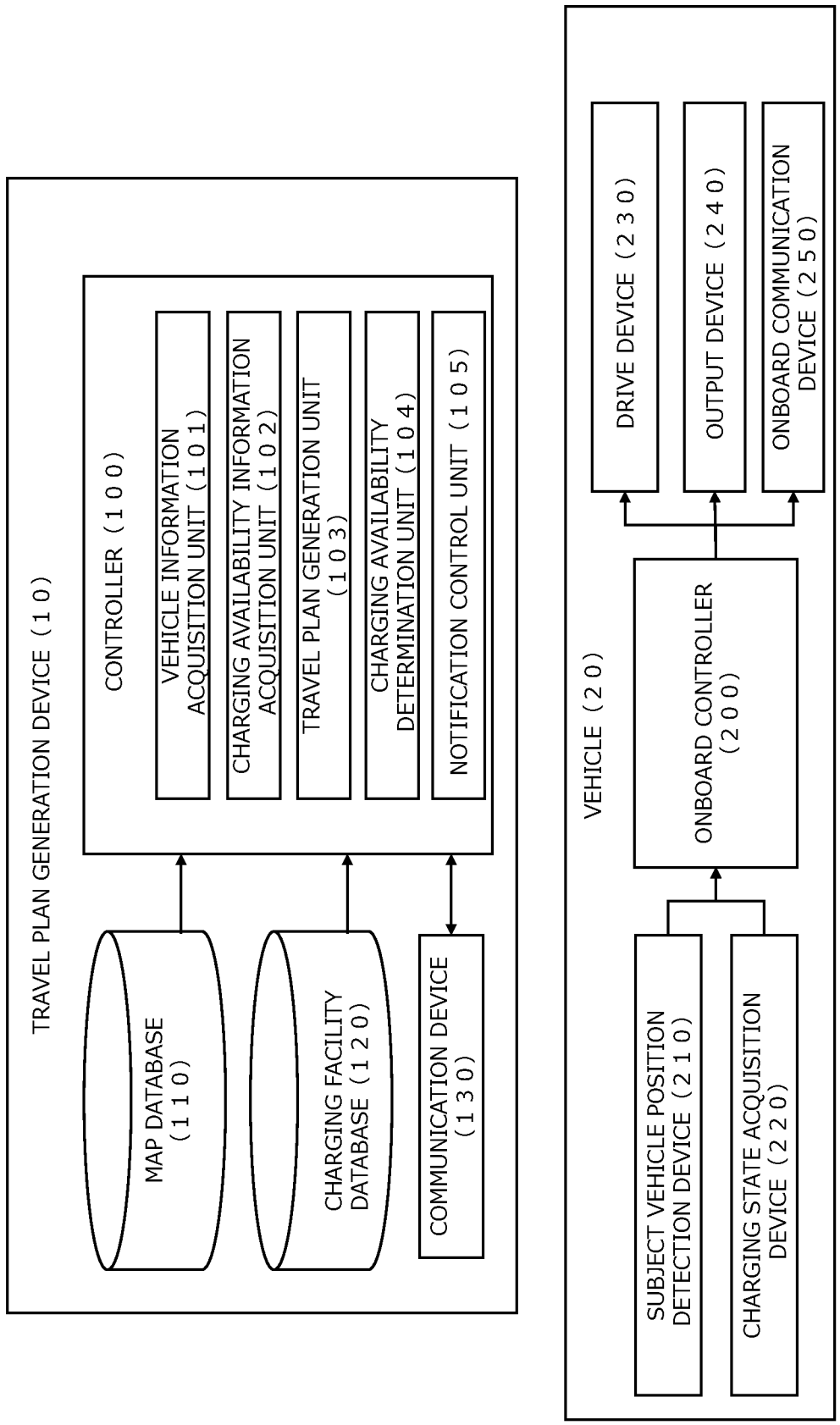
FIG. 1 is a block diagram illustrating an example of a travel plan generation device according to one or more embodiments of the present invention.

The configuration of the travel plan generation device according to one or more embodiments will be described with reference to FIG. 1. FIG. 1 is a block diagram illustrating an example of a travel plan generation device 10 according to one or more embodiments. As illustrated in FIG. 1, the travel plan generation device 10 according to one or more embodiments is connected to a vehicle 20 via a network constituting a telecommunication network. The travel plan generation device 10 may be connected to a plurality of vehicles. The travel plan generation device 10 is connected to an energy supply facility via a network. The travel plan generation device 10 may be connected to a plurality of energy supply facilities. The travel plan generation device 10 generates a travel plan in which the vehicle 20 travels from the present position to the destination through the energy supply facility based on vehicle information of the vehicle 20, information of the destination, and information of the energy supply facility. As illustrated in FIG. 1, the travel plan generation device 10 includes at least a controller 100, a map database 110, a charging facility database 120, and a communication device 130. Note that, in one or more embodiments of the present invention, an electric vehicle using, as a drive source, a motor driven by electric power supplied from a battery is described as an example of the vehicle 20, but it may be an automobile other than an electric vehicle. For example, the vehicle 20 may be an automobile using a gasoline engine as a drive source, or a hybrid automobile using both an engine and a motor as a drive source. When the vehicle 20 is an electric vehicle, the energy is described as an electric power and the energy supply facility is described as a charging facility. If the vehicle 20 is an automobile having an engine as a drive source, the energy may be used as a gasoline fuel, and the energy supply facility may be used as an oil supply facility.

The controller 100 includes a computer having hardware and software, the computer including a ROM (Read Only Memory) storing a program, a CPU (Central Processing Unit) executing the program stored in the ROM, and a RAM (Random Access Memory) functioning as an accessible storage device. As the operation circuitry, a MPU (Micro Processing Unit), DSP (Digital Signal Processor), ASIC (Application Specific Integrated Circuit), FPGA (Field Programmable Gate Array), or the like can be used instead of or together with CPU. The controller 100 includes, as functional blocks, a vehicle information acquisition unit 101, a charging availability information acquisition unit 102, a travel plan generation unit 103, a charging availability determination unit 104, and a notification control unit 105. The controller 100 executes each function in cooperation with software for implementing each of the above-described functions or executing each process, and hardware. Specifically, the controller 100 first acquires vehicle information of the vehicle 20, destination information, and charging facility information. Then, the controller 100 identifies the charging facility for charging the vehicle 20 as a first charging facility based on the vehicle information of the vehicle 20, the destination information, and the charging facility information. The controller 100 generates a travel plan in which the vehicle 20 travels from the present position to the destination through the first charging facility. When the charging of the vehicle 20 at the first charging facility becomes non-available after the vehicle 20 starts traveling in accordance with the generated travel plan until the vehicle 20 arrives at the first charging facility, the controller 100 identifies a charging facility different from the first charging facility as the second charging facility. Then, the controller 100 generates a travel plan in which the vehicle 20 passes through the second charging facility instead of the first charging facility. The first charging facility is a charging facility identified before or at the start of traveling of the vehicle 20. The second charging facility is a charging facility identified as a replacement facility of the first charging facility after the vehicle 20 starts traveling. Note that, in one or more embodiments of the present invention, the functions of the controller 100 are divided into five blocks, and the functions of the respective functional blocks are described, but the functions of the controller 100 are not necessarily divided into five blocks. The functions of the controller 100 may be divided into four or less functional blocks or six or more functional blocks. In one or more embodiments of the present invention, the controller 100 executes the respective functions as the configuration of the travel plan generation device 10, but the present invention is not limited. The respective functions of the controller 100 may be executed by the vehicle 20. For example, the travel plan generation device 10 includes a charging facility database 120 and manages updating of the charging facility database 120 and so on. Then, the onboard controller 200 of the vehicle 20 may acquire charging availability information from the charging facility database 120, determine whether or not charging is available at the charging facility, and generate a travel plan in which the vehicle 20 passes through the charging facility.

The vehicle information acquisition unit 101 acquires vehicle information of the vehicle 20 from the vehicle 20. The vehicle information includes at least position information of the vehicle 20 and battery information of the vehicle 20. The position information of the vehicle 20 is information indicating the present position of the vehicle 20. The battery information is information indicating the remaining capacity of the battery of the vehicle 20. In one or more embodiments of the present invention, the vehicle information acquisition unit 101 acquires the vehicle information of the vehicle 20 before the start of traveling of the vehicle 20 and during the travel of the vehicle 20. The vehicle information of the vehicle 20 is transmitted to the travel plan generation device 10 via an onboard communication device 250.

The charging availability information acquisition unit 102 acquires charging availability information of the charging facility. Specifically, the charging availability information acquisition unit 102 acquires from the charging facility database 120 full/vacant information indicating a vacancy state of a charging station in the charging facility as the charging availability information. The charging facility may have two or more charging stations. In one or more embodiments of the present invention, the charging availability information acquisition unit 102 acquires charging availability information of a first charging facility at a predetermined timing after the vehicle 20 starts traveling based on the travel plan. First, the charging availability information acquisition unit 102 sets, as the predetermined timing, a time point at which the vehicle 20 has reached a position within a predetermined range from the first charging facility. Then, the charging availability information acquisition unit 102 acquires the charging availability information of the first charging facility at the predetermined timing, that is, at a time point when the vehicle 20 has reached a position within a predetermined range from the first charging facility. The position within the predetermined range from the first charging facility is, for example, a point which is a predetermined distance away from the first charging facility or a point from which it takes a predetermined travel time to the first charging facility. The predetermined distance is, for example, distances of several kilometers to several tens of kilometers from the first charging facility. The predetermined travel time is, for example, several minutes to several tens of minutes. Based on the position information of the vehicle 20, the map information, and the position information of the first charging facility, the charging availability information acquisition unit 102 determines whether or not the vehicle 20 has reached a point which is a predetermined distance away from the first charging facility. The charging availability information acquisition unit 102 may determine whether or not the vehicle 20 has reached a point from which it takes a predetermined travel time to the first charging facility based on the distance to the first charging facility and the vehicle speed of the vehicle 20. The charging availability information acquisition unit 102 may set an interval between the predetermined timing to a predetermined interval. In this case, the charging availability information acquisition unit 102 acquires the charging availability information of the first charging facility at the predetermined intervals.

The charging availability information acquisition unit 102 may acquire, as the charging availability information of the first charging facility, full/vacant information indicating a vacancy state of a charging station in the first charging facility at a predetermined timing. The charging availability information acquisition unit 102 may acquire, as the charging availability information of the first charging facility, the full/vacant information indicating the vacancy state of the charging station in the first charging facility at a scheduled arrival time at which the vehicle 20 arrives at the first charging facility. Specifically, at first, the charging availability information acquisition unit 102 calculates the distance between the vehicle 20 and the first charging facility based on the position information of the vehicle 20 and the position information of the first charging facility, and calculates the scheduled arrival time of the vehicle 20 based on the calculated distance and the vehicle speed of the vehicle 20. Then, the charging availability information acquisition unit 102 acquires, as the charging availability information of the first charging facility, the full/vacant information indicating the vacancy state of the charging station in the first charging facility at the calculated scheduled arrival time. At this time, the charging availability information acquisition unit 102 acquires, as the full/vacant information of the first charging facility at the calculated scheduled arrival time, information on whether or not there are reservations for use of the charging station in the first charging facility at the scheduled arrival time and whether or not the charging of the vehicle being charged at the first charging facility is completed by the scheduled arrival time. The reason why the information on the reservation for use of the scheduled arrival time is acquired is that the vehicle 20 cannot be charged if the charging station is reserved for use when the vehicle 20 arrives, even if the charging station is in the vacancy state at the time of the predetermined timing. The reason why the information on whether or not the charging of the vehicle being charged is completed by the scheduled arrival time is acquired is that even if the charging station is in the full state at the time of the predetermined timing, the vehicle 20 can be charged if the charging station is not in use for charging at the time when the vehicle 20 arrives. Then, if the charging is completed in one of the vehicles at the first charging facility by the estimated arrival time of the vehicle 20, the charging availability information acquisition unit 102 acquires the full/vacant information indicating that there is a vacant space in the charging station of the first charging facility at the estimated arrival time.

Further, the charging availability information acquisition unit 102 acquires charging availability information of the second charging facility at the estimated arrival time at which the vehicle 20 arrives at the second charging facility. That is, the charging availability information acquisition unit 102 acquires full/vacant information indicating a vacancy state of the charging station in the second charging facility at the estimated arrival time. The charging availability information acquisition unit 102 acquires the charging availability information of the second charging facility after the estimated arrival time. The charging availability information of the second charging facility after the estimated arrival time is the full/vacant information indicating the vacancy state of the charging station in the second charging facility after the estimated arrival time. Specifically, the charging availability information acquisition unit 102 acquires, as the full/vacant information of the second charging facility after the estimated arrival time, information on whether or not there is a reservation for use of the charging station in the second charging facility after the estimated arrival time, and information on the time period until the charging of the vehicle being charged in the second charging facility is completed after the estimated arrival time. The charging availability information acquisition unit 102 may acquire the full/vacant information of the first charging facility after the time when the vehicle 20 arrives at the first charging facility.

The travel plan generation unit 103 generates a travel plan in which the vehicle 20 travels from the present position to the destination through the charging facility. First, the travel plan generation unit 103 calculates a travel route from the present position of the vehicle 20 to the destination based on the position information and the destination information of the vehicle 20. The destination information is information on the destination of the occupant of the vehicle 20 and is set by the occupant. The travel route calculated at this time may be a travel route in which the travel time from the present position to the destination is shortest, or may be a travel route in which the travel distance from the present position to the destination is shortest. Next, the travel plan generation unit 103 identifies a charging facility located on the calculated travel route as the first charging facility. Specifically, the travel plan generation unit 103 identifies a range of a travelable distance with the remaining battery capacity of the vehicle 20 based on the battery information of the vehicle 20. Then, the travel plan generation unit 103 identifies, as the first charging facility, a charging facility located on the travel route within the range based on the map information and the position information of the charging facilities. In addition, when there are a plurality of charging facilities located on the travel route within the range, the travel plan generation unit 103 identifies, as the first charging facility, a charging facility having the shortest travel distance or travel time from among the plurality of charging facilities. The travel plan generation unit 103 may identify not only a charging facility located on the travel route but also a charging facility located in a range of a predetermined distance from the travel route as the first charging facility. In this case, the travel plan generation unit 103 changes the travel route to a travel route in which the vehicle 20 passes through the identified first charging facility. As described above, the travel plan generation unit 103 generates the travel plan in which the vehicle 20 travels on the travel route from the present position to the destination.

The travel plan generation unit 103 may identify, as the first charging facility, a charging facility at which the charging of the vehicle 20 is available based on the charging availability information of the charging facility stored in the charging facility database 120. For example, the travel plan generation unit 103 acquires the charging availability information of the charging facility located within the range of the travelable distance with the remaining battery capacity of the vehicle 20, and identifies a charging facility at which the charging of the vehicle 20 is available as the first charging facility based on the charging availability information.

After the vehicle 20 starts traveling based on the generated travel plan, when the charging availability determination unit 104 determines that the charging of the vehicle 20 is not available at the first charging facility, the travel plan generation unit 103 generates a travel plan in which the vehicle 20 passes through the second charging facility instead of the first charging facility. Specifically, the travel plan generation unit 103 first searches for a second charging facility located within a predetermined distance from the first charging facility based on the position information of the first charging facility, the map information of the map database 110, and the charging facility information of the charging facility database 120. Then, the travel plan generation unit 103 identifies the second charging facility located within a predetermined distance from the first charging facility. At this time, the travel plan generation unit 103 may identify the second charging facility in which the charging of the vehicle 20 is available based on the charging availability information of the charging facility acquired by the charging availability information acquisition unit 102. The acquired charging availability information of the second charging facility is charging availability information at an estimated arrival time at which the vehicle 20 arrives at the second charging facility. Further, the travel plan generation unit 103 may identify the second charging facility according to preference of the occupant. For example, the preference of the occupant may be set by the occupant in advance, or may be estimated by a past history. For example, the travel plan generation unit 103 identifies, as the preference of the preference, a charging facility having a wide road width up to the charging facility as the second charging facility. Then, the travel plan generation unit 103 calculates a travel route on which the vehicle 20 travels from the present position to the destination through the second charging facility based on the position information of the vehicle 20, the destination information, and the position information of the second charging facility. The travel route calculated at this time may be a travel route in which the travel time from the present position to the destination is the shortest, or may be a travel route in which the travel distance from the present position to the destination is the shortest. As described above, the travel plan generation unit 103 generates the travel plan in which the vehicle 20 travels on the travel route from the present position to the destination.

Further, when the following determination is made by the charging availability determination unit 104, the travel plan generation unit 103 generates a travel plan in which the vehicle 20 arrives at the second charging facility after a lapse of time period from the estimated arrival time at which the vehicle 20 arrives at the second charging facility until the charging the of the vehicle 20 becomes available. Specifically, the charging availability determination unit 104 determines that the charging of the vehicle 20 is available at the second charging facility within an allowable waiting time period from the estimated arrival time based on the charging availability information of the second charging facility after the estimated arrival time. The allowable waiting time period is a time period set by the occupant. For example, the occupant sets a waiting time period allowed by the occupant himself/herself as the allowable waiting time period. Similarly to the second charging facility, the travel plan generation unit 103 may generate a travel plan in which the vehicle 20 arrives at the first charging facility after a lapse of time period from the estimated arrival time until the charging of the vehicle 20 becomes available, when determining that the charging is available at the first charging facility within the allowable waiting time period from the estimated arrival time. Further, the travel plan generation unit 103 may identify, as the second charging facility, a charging facility at which the charging of the vehicle 20 is available within the allowable waiting time period from the estimated arrival time, based on the determination of the availability of each charging facility located within the predetermined range from the first charging facility.

Further, as the travel control for controlling the vehicle 20 to arrive at the first charging facility or the second charging facility after the lapse of time period from the estimated arrival time until the charging of the vehicle 20 becomes available, the travel plan generation unit 103 selects a standby place of the vehicle 20 from the standby available place, and generates a travel plan in which the vehicle 20 stops at the standby place for a period of time until the charging of the vehicle 20 becomes available. The standby available place is registered in the map database 110 in advance. When the time period until the charging of the vehicle 20 becomes available is 5 minutes, the travel plan generation unit 103 generates the travel plan in which the vehicle 20 stops at the standby place for 5 minutes. Further, the travel plan generation unit 103 may generate a detour route for the vehicle 20 to detour, and may generate the travel plan in which the vehicle 20 travels the detour route for a period of time until the charging of the vehicle 20 becomes available.

Figure 2:
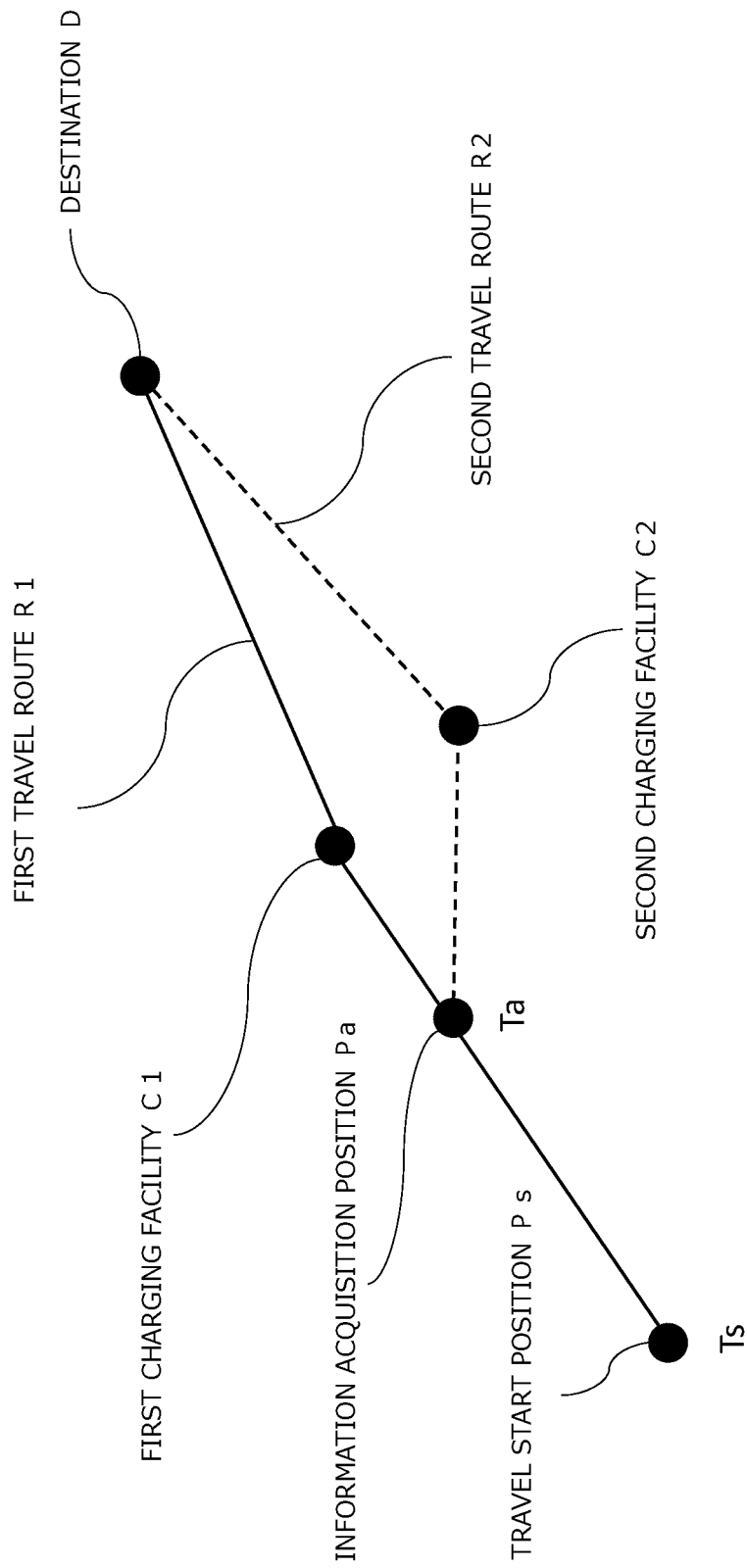
FIG. 2 is a diagram illustrating an example of generating of a travel plan according to one or more embodiments of the present invention.

FIG. 2 is a diagram illustrating an example of generating of a travel plan according to one or more embodiments of the present invention. FIG. 2 shows the position of the vehicle 20 at each time and the travel plan of the vehicle 20. In FIG. 2, time Ts is a time at which the vehicle 20 starts traveling. The vehicle 20 is located at the travel start position Ps at the time Ts. At this time, the travel plan generation device 10 generates the first travel route R1 based on the position information of the travel start position Ps, the destination D, and the first charging facility C1. Then, the vehicle 20 start traveling based on the first travel route R1. Then, at a predetermined timing Ta after starting the travel, the travel plan generation device 10 acquires the charging availability information of the first charging facility C1. When determining that the charging of the vehicle 20 is not available at the first charging facility C1 based on the charging availability information of the first charging facility C1, the travel plan generation device 10 generates the second travel route R2 in which the vehicle 20 travels from the information acquisition position Pa of the vehicle 20 to the destination D through the second charging facility C2. Note that, in FIG. 2, an example in which one charging facility is present on the travel route is illustrated, but the present invention is not limited, and the vehicle 20 may pass through a plurality of charging facilities on the travel route. In this case, the travel plan generation device 10 acquires the charging availability information for each charging facility, and determines whether or not the charging of the vehicle 20 is available at the charging facility.

The charging availability determination unit 104 determines whether or not the charging of the vehicle 20 is available at the charging facility based on the charging availability information of the charging facility acquired by the charging availability information acquisition unit 102. For example, when the charging availability information acquisition unit 102 acquires the full/vacant information indicating that there is no available space in the charging station of the charging facility, the charging availability determination unit 104 determines that the charging of the vehicle 20 is not available at the charging facility. In addition, when the charging availability information acquisition unit 102 acquires the full/vacant information indicating that there is a vacant space in the charging station of the charging facility, the charging availability determination unit 104 determines that the charging of the vehicle 20 is available at the charging facility. In one or more embodiments according to the present invention, the charging availability determination unit 104 determines whether or not the charging of the vehicle 20 is available at the first charging facility based on the charging availability information of the first charging facility acquired by the charging availability information acquisition unit 102. Further, the charging availability determination unit 104 determines whether or not the charging of the vehicle 20 is available at the second charging facility at the estimated arrival time based on the charging availability information of the second charging facility at the estimated arrival time at which the vehicle 20 arrives at the second charging facility. Further, when determining that the charging of the vehicle 20 is not available at the second charging facility at the estimated arrival time, the charging availability determination unit 104 determines whether or not the charging of the vehicle 20 is available at the second charging facility within the allowable waiting time period from the estimated arrival time based on the charging availability information of the second charging facility after the estimated arrival time. Specifically, the charging availability determination unit 104 compares the time period until the charging of the vehicle 20 becomes available at the second charging facility with the allowable waiting time period. When the time period until the charging of the vehicle 20 becomes available is shorter than the allowable waiting time period, the charging availability determination unit 104 determines that the charging of the vehicle 20 at the second charging facility becomes available within the allowable waiting time period from the estimated arrival time. Further, the charging availability determination unit 104 determines whether or not the charging of the vehicle 20 becomes available at the first charging facility within the allowable waiting time period based on the charging availability information of the first charging facility after the time when the vehicle 20 arrives at the first charging facility. Further, the charging availability determination unit 104 may determine whether or not the charging of the vehicle 20 becomes available within the allowable waiting time period from the estimated arrival time for each charging facility located in a predetermined range from the first charging facility.

When determining that there is no charging facility at which the charging of the vehicle 20 is available within the allowable waiting time period from the estimated arrival time, the notification control unit 105 transmits to the vehicle 20 notification information indicating that there is no charging facility at which the charging of the vehicle 20 is available within the allowable waiting time period from the estimated arrival time. The notification information may include information on a waiting time period until the charging of the vehicle 20 becomes available at the second charging facility. Further, the notification information may include proposal information suggesting that the vehicle 20 stops at the standby place or travels on the detour route during the waiting time period.

The map database 110 is map information including road information, and stores the road information including, for example, an intersection or a branch point as a node and a road section between a node and a node as a link. In one or more embodiments according to the present invention, the map information is used when the travel plan generation unit 103 generates a travel plan.

The charging facility database 120 stores charging facility information related to one or more charging facilities. The charging facility information includes at least identification information of the charging facility, position information indicated by longitude and latitude, and charging availability information. The charging facility database 120 stores the charging facility information for each charging facility. The charging availability information includes full/vacant information indicating a vacant state of the charging station in the charging facility. Specifically, the charging availability information includes the full/vacant information indicating the vacant state at a predetermined timing for each charging station disposed in the charging facility. In addition, the full/vacant information includes information related to the reservation for use of the charging station. Specifically, the full/vacant information includes information on a time in which a reservation for use is made for each charging station of the charging facility. In addition, the full/vacant information includes information on the charging time of the vehicle in a case in which there is a vehicle being charged for each charging station of the charging facility. The charging availability information is acquired via the communication device 130 for each charging facility and is updated in real time.

The communication device 130 transmits and receives information between the onboard communication device 250 of the vehicle 20 via the network. The communication device 130 transmits the travel plan information to the vehicle 20. The communication device 130 also receives the vehicle information from the vehicle 20. In addition, the communication device 130 receives the charging availability information from the charging facility.

Next, the vehicle 20 will be described. The vehicle 20 includes at least an onboard controller 200, a subject vehicle position detection device 210, a charging state acquisition device 220, a drive device 230, an output device 240, and an onboard communication device 250. In one or more embodiments according to the present invention, the vehicle 20 is assumed to be a vehicle capable of autonomous traveling, but the present invention is not limited, and may be a vehicle operated by a driver.

The onboard controller 200 is a computer configured to control each unit of the vehicle 20 and includes a ROM (Read Only Memory storing a program), a CPU (Central Processing Unit) executing the program stored in the ROM, and a RAM (Random Access Memory) that functions as an accessible storage device. For example, the onboard controller 200 acquires various kinds of information from the subject vehicle position detection device 210 and the charging state acquisition device 220, and transmits the various kinds of information to the travel plan generation device 10 via the onboard communication device 250. In addition, the onboard controller 200 acquires the travel plan information from the onboard communication device 250, and outputs a signal of a target control amount for controlling the travel of the vehicle 20 to the drive device 230.

The subject vehicle position detection device 210 detects the present position of the vehicle 20, and can use, for example, a GPS device. The subject vehicle position detection device 210 acquires position information of the vehicle 20 by receiving radio waves transmitted from a plurality of satellite communications by a receiver. Further, the subject vehicle position detection device 210 can detect a change in the position information of the vehicle 20 by periodically receiving radio waves transmitted from a plurality of satellite communications. The acquired position information of the vehicle 20 is transmitted to the travel plan generation device 10. In one or more embodiments according to the present invention, the position information on the present position of the vehicle 20 is used when the vehicle 20 travels along the travel route.

The charging state acquisition device 220 acquires battery information indicating the remaining battery capacity of the battery mounted on the vehicle 20. The acquired battery information is transmitted to the travel plan generation device 10 via the onboard communication device 250.

The drive device 230 executes travel control including acceleration/deceleration and steering of the vehicle 20 in order to travel in accordance with the travel plan acquired from the travel plan generation device 10. The drive device 230 includes, for example, an electric motor and/or an internal combustion engine, which are travel drive sources, a power transmission device including a drive shaft and an automatic transmission that transmit outputs from the travel drive sources to drive wheels, and a drive mechanism such as a braking device that brakes the wheels. In addition, the driving device 230 may include other devices necessary for the vehicle 20 to travel, such as a headlight, a direction indicator, a hazard lamp, and a wiper.

The output device 240 outputs various kinds of information to the occupant of the vehicle 20. The output device 240 is, for example, a speaker that outputs various types of information. The output device 240 may be configured by a display. In one or more embodiments according to the present invention, when there is no charging facility at which the charging of the vehicle 20 is available within the allowable waiting time period from the estimated arrival time, the output device 240 outputs the notification information indicating that there is no charging facility at which the charging of the vehicle 20 is available within the allowable waiting time period from the estimated arrival time.

The onboard communication device 250 transmits and receives information to and from the communication device 130 of the travel plan generation device 10 via the network. The onboard communication device 250 receives the travel plan information of the vehicle 20 from the communication device 130. In addition, the onboard communication device 250 transmits the vehicle information, that is, the position information and the battery information of the vehicle 20, to the communication device 130.

Figure 3:
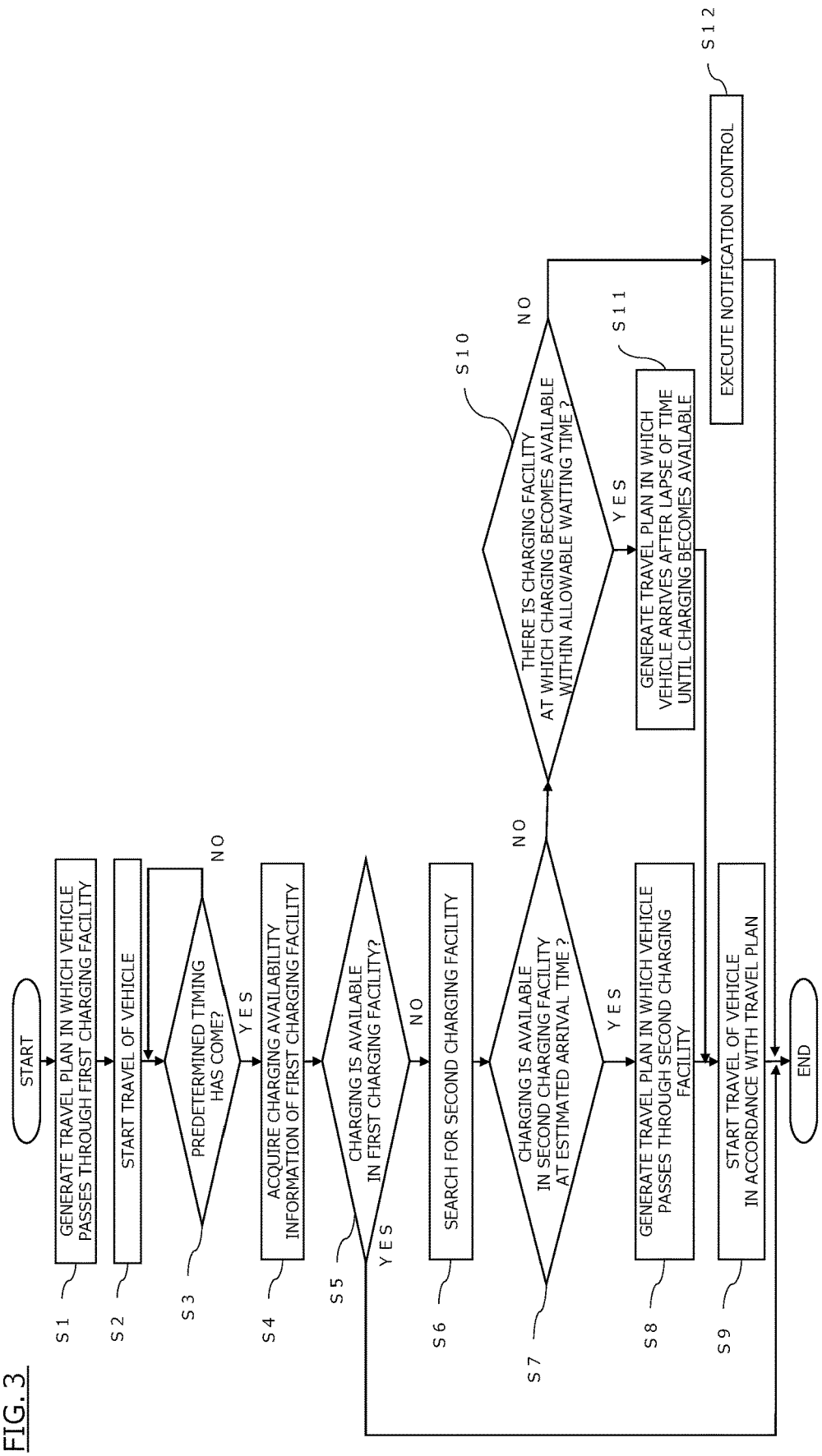
FIG. 3 is a flowchart of a travel plan generation method according to one or more embodiments of the present invention.

Next, an example of a flowchart of a travel plan generation method executed by the travel plan generation device 10 having the above-described configuration will be described with reference to FIG. 3. In one or more embodiments according to the present invention, when the occupant of the vehicle 20 inputs the destination information of the vehicle 20, the control flow is executed from step S1.

In step S1, the controller 100 generates a travel plan in which the vehicle 20 travels from the present position to the destination via the first charging facility. Specifically, the controller 100 generates the travel plan based on the position information of the vehicle 20, the destination information, and the position information of the first charging facility.

In step S2, the controller 100 starts the travel of the vehicle 20 based on the generated travel plan. Specifically, the controller 100 transmits the travel plan information to the vehicle 20 and controls the drive device 230 of the vehicle 20 to drive the vehicle 20 based on the transmitted travel plan.

In step S3, the controller 100 determines whether or not a predetermined timing has come until the vehicle 20 arrives at the first charging facility after the vehicle 20 starts traveling toward the first charging facility. For example, the controller 100 determines, as the predetermined timing, whether or not the position of the vehicle 20 has reached the position of the predetermined distance from the first charging facility based on the position information of the vehicle 20 and the map information. When determining that the predetermined timing has come, the process proceeds to step S4. When determining that the predetermined timing has not come, the process returns to step S3, and the process is repeated until the predetermined timing has come.

In step S4, the controller 100 acquires charging availability information of the first charging facility. For example, the controller 100 acquires full/vacant information of the first charging facility at the predetermined timing from the charging facility database 120. At this time, the controller 100 may acquire the full/vacant information of the first charging facility at the scheduled arrival time at which the vehicle 20 arrives at the first charging facility.

In step S5, the controller 100 determines whether or not the charging of the vehicle 20 is available at the first charging facility based on the charging availability information of the first charging facility acquired in step S4. The controller 100 determines that the charging of the vehicle 20 is not available at the first charging facility when acquiring, as the charging availability information, the full/vacant information indicating that there are no charging stations available in the first charging facility. When determining that the charging of the vehicle 20 is not available at the first charging facility, the process proceeds to step S6. When determining that the charging of the vehicle 20 is available at the first charging facility, the flow ends.

In step S6, the controller 100 searches for a second charging facility as a replacement facility for the first charging facility. For example, the controller 100 searches for the second charging facility that is within a predetermined distance from the first charging facility, and that can charge the vehicle 20 at the estimated arrival time at which the vehicle 20 arrives.

In step S7, the controller 100 determines, based on the search result of the second charging facility, whether or not the charging of the vehicle 20 is available at the second charging facility at the estimated arrival time at which the vehicle 20 arrives at the second charging facility. When the charging of the vehicle 20 is available at the second charging facility at the estimated arrival time, the process proceeds to step S8. When the charging of the vehicle 20 is not available at the second charging facility at the estimated arrival time, the process proceeds to step S10.

In step S8, the controller 100 generates a travel plan in which the vehicle 20 travels from the present position to the destination through the second charging facility. Specifically, the controller 100 generates the travel plan based on the position information of the vehicle 20, the destination information, and the position information of the second charging facility.

In step S9, the controller 100 starts the control of the travel of the vehicle 20 in accordance with the travel plan after generating the travel plan in which the vehicle 20 passes through the second charging facility. Specifically, the controller 100 transmits the travel plan information to the vehicle 20, and controls the drive device 230 of the vehicle 20 based on the travel plan for traveling of the vehicle 20.

In one or more embodiments according to the present invention, after changing the charging facility through which the vehicle 20 passes from the first charging facility to the second charging facility, the controller 100 may acquire the charging availability information of the second charging facility at a predetermined timing while the vehicle 20 is traveling toward the second charging facility, and determine whether or not the charging of the vehicle 20 is available at the second charging facility. In this case, when determining that the charging of the vehicle 20 is not available at the second charging facility, the controller 100 searches for a charging facility different from the second charging facility again and generates a new travel plan.

In step S10, the controller 100 determines whether or not there is a charging facility at which the charging of the vehicle 20 becomes available within the allowable waiting time period from the estimated arrival time at which the vehicle 20 arrives at the charging facility. Specifically, the controller 100 determines whether or not the charging of the vehicle 20 becomes available at the first charging facility or the second charging facility within the allowable waiting time period from the estimated arrival time. Further, the controller 100 may determine whether or not the charging of the vehicle 20 becomes available within the allowable waiting time period from the estimated arrival time for each charging facility located in a predetermined range from the first charging facility. When there is a charging facility at which the charging of the vehicles 20 becomes available within the allowable waiting time period from the estimated arrival time, the process proceeds to step S11. When there is no charging facility at which the charging of the vehicles 20 becomes available within the allowable waiting time period from the estimated arrival time, the process proceeds to step S12. Further, in step S10, the controller 100 may compare the time periods until the charging of the vehicle 20 becomes available at each charging facility, and select a charging facility at which the charging of the vehicle 20 becomes available more quickly.

In step S11, the controller 100 generates a travel plan in which the vehicle 20 arrives at the first charging facility or the second charging facility after a lapse of time period from the estimated arrival time until the charging of the vehicle 20 becomes available. For example, the controller 100 controls the vehicle 20 to travel to a predetermined standby place, stop at the standby place for a period of time until the charging of the vehicle 20 becomes available. Then the controller 100 controls the vehicle to travel to the first charging facility or the second charging facility. This will allow the vehicle 20 to arrive at the first charging facility or the second charging facility after a lapse of time period from the estimated arrival time until the charging of the vehicle 20 becomes available.

In step S12, the controller 100 controls the output device 240 of the vehicle 20 to execute notification control. Specifically, the controller 100 controls the output device 240 to notify notification information indicating that there is no charging facility at which the charging of the vehicle 20 becomes available within the allowable waiting time period from the estimated arrival time.

As described above, the travel plan generation device and travel plan generation method according to the present embodiment generate a travel plan in which a vehicle passes through a first supply facility for supplying energy of the vehicle, acquire supply availability information on the energy of the first supply facility at a predetermined timing after the vehicle starts traveling based on the generated travel plan, determine whether or not supply of the energy is available at the first supply facility based on the supply availability information, when determining that the supply of the energy is not available at the first supply facility, identify a second supply facility different from the first supply facility and generate the travel plan in which the vehicle passes through the second supply facility instead of the first supply facility. Accordingly, the charging facility through which the vehicle passes can be changed when the supply of the energy for the vehicle becomes not available at the charging facility after the vehicle starts traveling until the vehicle arrives at the charging facility through which the vehicle is scheduled to pass.

Furthermore, the travel plan generation device and travel plan generation method according to the present embodiment set, as the predetermined timing, a time point at which the vehicle has reached a position within a predetermined range from the first supply facility. This enables the controller to grasp whether or not the supply of the energy at the first supply facility is available when the vehicle approaches the first supply facility.

Furthermore, the travel plan generation device and travel plan generation method according to the present embodiment set an interval between the predetermined timing to a predetermined interval. This enables the controller to grasp whether or not the supply of the energy at the first supply facility is available at a predetermined interval.

Furthermore, the travel plan generation device and travel plan generation method according to the present embodiment acquire, as the first supply availability information, full/vacant information indicating a vacancy state of a charging station in the first supply facility at the predetermined timing. This enables the controller to determine whether or not the supply of the energy at the first charging facility is available based on the vacancy state of the charging station in the first charging facility at the predetermined timing.

Furthermore, the travel plan generation device and travel plan generation method according to the present embodiment acquire, as the first supply availability information, full/vacant information indicating a vacancy state of a charging station at the first supply facility at a scheduled arrival time at which the vehicle arrives at the first supply facility. This enables the controller to determine whether or not the supply of the energy at the first charging facility is available based on the vacancy state of the charging station in the first charging facility at the time when the vehicle arrives at the first charging facility.

Furthermore, the travel plan generation device and travel plan generation method according to the present embodiment acquire second supply availability information of the second supply facility after an estimated arrival time at which the vehicle arrives at the second supply facility, determine whether or not the supply of the energy is available at the second supply facility based on the second supply availability information, and when determining that the supply of the energy is available at the second supply facility, generate the travel plan in which the vehicle arrives at the second supply facility after a lapse of time period from the estimated arrival time until the supply of the energy becomes available. This enables the controller to adjust the arrival time of the vehicle at a timing at which the supply of the energy becomes available at the second supply facility.

Furthermore, the travel plan generation device and travel plan generation method according to the present embodiment acquire first supply availability information of the first supply facility after an estimated arrival time at which the vehicle arrives at the first supply facility, determine whether or not the supply of the energy is available at the first supply facility based on the first supply availability information and when determining that the supply of the energy is available at the first supply facility, generate the travel plan in which the vehicle arrives at the first supply facility after a lapse of time period from the estimated arrival time until the supply of the energy becomes available. This enables the controller to adjust the arrival time of the vehicle at a timing at which the supply of the energy becomes available at the first supply facility.

Furthermore, the travel plan generation device and travel plan generation method according to the present embodiment select a standby place for the vehicle to standby from a standby available place registered in advance in map information and generate the travel plan in which the vehicle stops at the standby place for a time period until the supply of the energy becomes available. This enables the controller to adjust the time of arrival at the first supply facility or the second supply facility by stopping the vehicle at the standby place.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

10 . . . Travel plan generation device
   100 . . . Controller
      101 . . . Vehicle information acquisition unit
      102 . . . Charging availability information acquisition unit
      103 . . . Travel plan generation unit
      104 . . . Charging availability determination unit
      105 . . . Notification control unit
   110 . . . Map database
   120 . . . Charging facility database
   130 . . . Communication device
20 . . . Vehicle
   200 . . . Onboard controller
   210 . . . Subject vehicle position detection device
   220 . . . Charging state acquisition device
   230 . . . Drive device
   240 . . . Output device
   250 . . . Onboard communication device

The invention claimed is:

1. A travel plan generation device comprising:
a controller, the controller is configured to:
   generate a travel plan in which a vehicle passes through a first supply facility for supplying energy of the vehicle;
   acquire first supply availability information indicating a vacancy state of a first supply facility when the vehicle arrives at a position within a predetermined range from the first supply facility at a predetermined timing after the vehicle starts traveling based on the generated travel plan; and
   determine whether or not supply of the energy is available at the first supply facility based on the first supply availability information of the first supply facility; and
   when determining that the supply of the energy is not available at the first supply facility, identify a second supply facility different from the first supply facility and generate the travel plan in which the vehicle passes through the second supply facility instead of the first supply facility.

2. The travel plan generation device according to claim 1, wherein the controller is further configured to acquire, as the first supply availability information, a vacancy state of a charging station in the first supply facility at the predetermined timing.

3. The travel plan generation device according to claim 1, wherein the controller is further configured to acquire, as the first supply availability information, a vacancy state of a charging station at the first supply facility at a scheduled arrival time at which the vehicle arrives at the first supply facility.

4. The travel plan generation device according to claim 1, wherein the controller is further configured to:
   acquire second supply availability information of the second supply facility after an estimated arrival time at which the vehicle arrives at the second supply facility;
   determine whether or not the supply of the energy is available at the second supply facility based on the second supply availability information; and
   when determining that the supply of the energy is available at the second supply facility, generate the travel plan in which the vehicle arrives at the second supply facility after a lapse of time from the estimated arrival time until the supply of the energy becomes available.

5. The travel plan generation device according to claim 4, wherein the controller is further configured to select a standby place for the vehicle to standby from a standby available place registered in advance in map information and generates the travel plan in which the vehicle stops at the standby place for a time period until the supply of the energy becomes available.

6. The travel plan generation device according to claim 1, wherein the controller is further configured to:
   acquire the first supply availability information of the first supply facility after an estimated arrival time at which the vehicle arrives at the first supply facility;
   determine whether or not the supply of the energy is available at the first supply facility based on the first supply availability information; and
   when determining that the supply of the energy is available at the first supply facility, generate the travel plan in which the vehicle arrives at the first supply facility after a lapse of time from the estimated arrival time until the supply of the energy becomes available.

7. A travel plan generation device comprising:
a controller, the controller is configured to:
   generate a travel plan in which a vehicle passes through a first supply facility for supplying energy of the vehicle;
   acquire first supply availability information on the energy of a first supply facility at a predetermined timing after the vehicle starts traveling based on the generated travel plan;
   determine whether or not supply of the energy is available at the first supply facility based on the first supply availability information of the first supply facility; and
   when determining that the supply of the energy is not available at the first supply facility, identify a second supply facility different from the first supply facility and generate the travel plan in which the vehicle arrives at one of the first and second supply facilities in which the supply of the energy becomes available within an allowable waiting time from an estimated arrival time after a lapse of time from the estimated arrival time until the supply of the energy becomes available.

8. A travel plan generation method executed by a controller, the method comprises:
   generating a travel plan in which a vehicle passes through a first supply facility for supplying energy of the vehicle;
   acquiring supply availability information indicating a vacancy state of the first supply facility when the vehicle arrives at a position within a predetermined range from the first supply facility as a predetermined timing after the vehicle starts traveling based on the generated travel plan;
   determining whether or not supply of the energy is available at the first supply facility based on the supply availability information;
   when determining that the supply of the energy is not available at the first supply facility, identifying a second supply facility different from the first supply facility; and generating the travel plan in which the vehicle passes through the second supply facility instead of the first supply facility.

\* \* \* \* \*